(12) United States Patent
Tomita et al.

(10) Patent No.: US 7,319,475 B2
(45) Date of Patent: Jan. 15, 2008

(54) METHOD AND APPARATUS FOR IMAGE FORMING CAPABLE OF PREVENTING IMAGE QUALITY DETERIORATION INDUCED BY HEAT FROM AN OPTICAL DEFLECTOR

(75) Inventors: Yasumasa Tomita, Tokyo (JP); Hiroshi Yoshizawa, Kanagawa-ken (JP); Tetsuya Kimura, Tokyo (JP); Masato Yokoyama, Kanagawa-ken (JP); Keiji Okamoto, Kanagawa-ken (JP); Keiichi Serizawa, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 383 days.

(21) Appl. No.: 10/857,019

(22) Filed: Jun. 1, 2004

(65) Prior Publication Data
US 2005/0052719 A1    Mar. 10, 2005

(30) Foreign Application Priority Data
May 30, 2003    (JP)    ............................ 2003-154513

(51) Int. Cl.
*B41J 15/14*    (2006.01)
*B41J 27/00*    (2006.01)
(52) U.S. Cl. ...................................... 347/243; 347/259
(58) Field of Classification Search ........ 347/230–231, 347/241–245, 248, 256–261, 263; 359/196–197, 359/201–203, 204, 212–220; 399/111
See application file for complete search history.

(56) References Cited

U.S. PATENT DOCUMENTS

| | | | |
|---|---|---|---|
| 4,776,715 A | 10/1988 | Takada et al. | |
| 4,796,037 A | 1/1989 | Takada et al. | |
| 4,796,963 A * | 1/1989 | Yoshimura | ................... 359/218 |
| 4,939,550 A | 7/1990 | Takada et al. | |

(Continued)

FOREIGN PATENT DOCUMENTS

JP    10-186267    7/1998

(Continued)

OTHER PUBLICATIONS

Patent Abstracts of Japan, JP 09-105881, Apr. 22, 1997.

(Continued)

*Primary Examiner*—Hai Pham
(74) *Attorney, Agent, or Firm*—Oblon, Spivak, McClelland, Maier & Neustadt, P.C.

(57) ABSTRACT

An image forming apparatus includes an image bearing member having a photosensitive surface and an optical writing apparatus generating a laser beam modulated according to image data. The optical writing apparatus includes a housing, an optical deflector, an f-theta lens and a separator. The optical deflector is configured to rotate to deflect the laser beam. The f-theta lens is configured to correct the laser beam deflected by the optical deflector and to transmit a corrected laser beam towards the image bearing member. The separator is configured to separate an inside space of the housing into at least two sections including a first section in which the optical deflector is mounted and a second section in which the f-theta lens is mounted. The separator includes a heat resistant transparent plate disposed at a position of crossing passage of the laser beam between the optical deflector and the f-theta lens.

73 Claims, 6 Drawing Sheets

U.S. PATENT DOCUMENTS

| | | | |
|---|---|---|---|
| 4,943,128 A | 7/1990 | Takada et al. | |
| 4,970,552 A | 11/1990 | Okamoto et al. | |
| 5,055,878 A | 10/1991 | Okamoto et al. | |
| 5,132,740 A | 7/1992 | Okamoto et al. | |
| 5,166,704 A * | 11/1992 | Yasuda | 347/248 |
| 5,299,051 A * | 3/1994 | Hirano | 359/216 |
| 5,321,483 A | 6/1994 | Yokoyama et al. | |
| 5,390,006 A | 2/1995 | Wakabayashi et al. | |
| 5,671,081 A * | 9/1997 | Hisa | 359/216 |
| 5,719,684 A | 2/1998 | Ohkaji et al. | |
| 5,799,229 A | 8/1998 | Yokoyama et al. | |
| 5,878,317 A | 3/1999 | Masuda et al. | |
| 5,900,961 A * | 5/1999 | Miyamoto et al. | 359/196 |
| 5,946,529 A | 8/1999 | Sato et al. | |
| 6,115,164 A * | 9/2000 | Kamikubo | 359/196 |
| 6,195,190 B1 * | 2/2001 | Tachibe et al. | 359/216 |
| 6,400,488 B1 * | 6/2002 | Nagasaka et al. | 359/212 |
| 6,400,917 B2 * | 6/2002 | Nakazato et al. | 399/111 |
| 6,416,176 B1 | 7/2002 | Yasui et al. | |
| 6,484,000 B1 | 11/2002 | Ogawa et al. | |
| 6,593,951 B2 | 7/2003 | Yokoyama et al. | |
| 6,634,640 B1 | 10/2003 | Yoshizawa et al. | |
| 6,654,044 B2 * | 11/2003 | Akuta | 347/260 |
| 6,934,061 B2 * | 8/2005 | Ono et al. | 359/204 |
| 2001/0001251 A1 | 5/2001 | Tachibe et al. | |
| 2002/0192000 A1 | 12/2002 | Yasui et al. | |
| 2003/0226959 A1 | 12/2003 | Kimura | |
| 2004/0041992 A1 | 3/2004 | Yokoyama | |

FOREIGN PATENT DOCUMENTS

| | | |
|---|---|---|
| JP | 2002-148542 | 5/2002 |

OTHER PUBLICATIONS

Patent Abstracts of Japan, JP 2001-305450, Oct. 31, 2001.
Patent Abstracts of Japan, JP 2002-127497, May 8, 2002.
U.S. Appl. No. 09/374,133, filed Aug. 10, 1999.
U.S. Appl. No. 09/330,669, filed Jun. 11, 1999.
U.S. Appl. No. 10/218,471, filed Aug. 14, 2002, Yasui et al.
U.S. Appl. No. 10/437,135, filed May 13, 2003, Yokoyama.
U.S. Appl. No. 10/452,458, filed Jun. 2, 2003, Kimura.
U.S. Appl. No. 10/247,644, filed Sep. 20, 2002, Yoshizawa.
U.S. Appl. No. 10/323,808, filed Dec. 20, 2002, Yoshizawa.
U.S. Appl. No. 10/644,839, filed Aug. 21, 2003, Tomita.
U.S. Appl. No. 10/663,782, filed Sep. 17, 2003, Yokoyama.
U.S. Appl. No. 10/857,019, filed Jun. 1, 2004, Tomita et al.

* cited by examiner

BACKGROUND

BACKGROUND

METHOD AND APPARATUS FOR IMAGE FORMING CAPABLE OF PREVENTING IMAGE QUALITY DETERIORATION INDUCED BY HEAT FROM AN OPTICAL DEFLECTOR

CROSS REFERENCE TO RELATED APPLICATIONS

The present application claims priority under 35 U.S.C. § 119 to Japanese Patent Application No. 2003-154513 filed on May 30, 2003 in the Japanese Patent Office, the entire contents of which are incorporated herein by reference.

BACKGROUND OF THE INVENTION

1. Field of the Invention

The present invention relates to a method and apparatus for image forming, and more particularly relates to a method and apparatus for image forming capable of preventing image quality deterioration induced by a heat from an optical deflector by insulating f-theta lenses from the optical deflector.

2. Discussion of the Background

A conventional color image forming apparatus includes a copying machine, a facsimile machine, a printing machine and other similar image forming apparatus. In a conventional color image forming apparatus having a structure for a tandem operation, an optical writing apparatus includes a plurality of light sources to emit respective laser beams according to image data. The laser beams irradiate respective image bearing members which are arranged in parallel, so that electrostatic latent images are formed on surfaces of the respective image bearing members.

The conventional color image forming apparatus also includes developing units for operating with the respective image bearing members. The developing units visualize the respective electrostatic latent images formed on the surfaces of the respective image bearing members as toner images of different colors, such as yellow, magenta, cyan and black toner images. In synchronization with movements in the operations as described above, a transfer member such as a transfer sheet is conveyed on a transfer belt. The toner images of different colors are transferred onto the transfer member as an overlaid toner image. The overlaid toner image is fixed by a fixing unit and then is discharged to a sheet discharging part.

The conventional color image forming apparatus generally includes a plurality of optical components separately provided to the optical writing apparatus corresponding to the number of the image bearing members. The plurality of optical components include an optical deflector having a polygon mirror and a motor for driving the polygon mirror. Such optical components are relatively expensive.

When the plurality of optical components are separately provided as described above, part cost and production cost increase, and a large space is required in the optical writing system for arranging the plurality of optical components therein. Therefore, the conventional color image forming apparatus may become large in size.

Under the above-described circumstances, a technique has been proposed as illustrated in FIG. 1.

FIG. 1 shows a conventional color laser printer 1. The conventional color laser printer 1 includes an optical writing apparatus 2, a sheet feeding system 3, an intermediate transfer belt 4, four image bearing members 5A, 5B, 5C and 5D, four primary transfer rollers 6A, 6B, 6C and 6D, registration rollers 7, a secondary transfer roller 8 and a fixing unit 9. The four image bearing members 5A, 5B, 5C and 5D are included in respective image forming units (not shown).

The optical writing apparatus 2 is located between the sheet feeding system 3 and the image forming units in the background color laser printer 1 of FIG. 1.

The sheet feeding system 3 is arranged at a bottom location of the background color laser printer 1.

The intermediate transfer belt 4 is arranged above the image forming units. The intermediate transfer belt 4 forms an endless belt extended with pressure by rollers 10 and 11. The intermediate transfer belt 4 is held in contact between the primary transfer rollers 6A, 6B, 6C and 6D arranged at a position opposite to the image bearing members 5A, 5B, 5C and 5D, respectively, such that the toner images formed on the respective image bearing members 5A, 5B, 5C and 5D are transferred onto the intermediate transfer belt 4 to overlay different color toner images to obtain a recorded image.

The image bearing members 5A, 5B, 5C and 5D are included in the respective image forming units which are arranged in parallel under the intermediate transfer belt 4. Each of the image forming units further includes a charging unit, a developing unit, a discharging unit and a cleaning unit which are not shown in FIG. 1. The image forming units have identical structures with developers of different colors of yellow, magenta, cyan and black.

The color laser printer 1 produces a full-color image through the following operations.

The image bearing members 5A, 5B, 5C and 5D rotate clockwise, which is a direction A in FIG. 1, by a motor (not shown). The charging unit is applied with a charged voltage and then uniformly charges the image bearing members 5A, 5B, 5C and 5D to a predetermined polarity.

The optical writing apparatus 2 optically modulates laser beams L1, L2, L3 and L4 and emits the laser beams L1, L2, L3 and L4 from under the respective image forming units toward the respective image bearing members 5A, 5B, 5C and 5D, respectively, through gaps between the charging units and the developing units of the respective image forming units. The laser beams L1, L2, L3 and L4 irradiate the surfaces of the respective image bearing members 5A, 5B, 5C and 5D so that respective electrostatic latent images are formed on the surfaces of the image bearing members 5A, 5B, 5C and 5D. The electrostatic latent images are generated based on respective single color image data of yellow, magenta, cyan and black which are converted from color image data of a full-color image. The electrostatic latent images are visualized by the respective developing units having developers of different colors corresponding to respective electrostatic latent images as color toner images.

As shown in FIG. 1, the intermediate transfer belt 4 rotates in the direction A. The color toner images formed on the surfaces of the respective image bearing members 5A, 5B, 5C and 5D are sequentially overlaid on the surface of the intermediate transfer belt 4 so that an overlaid color toner image is formed on a surface of the intermediate transfer belt 4.

After the color toner images on the surfaces of the respective image bearing members 5A, 5B, 5C and 5D are transferred onto the intermediate transfer belt 4, the cleaning units corresponding to the image forming units scrapes the surfaces of the respective image bearing members 5A, 5B, 5C and 5D to remove residual toner adhering to the surfaces of the respective image bearing members 5A, 5B, 5C and 5D.

After the cleaning units remove the residual toner, the discharging units corresponding to the image forming units discharge the surfaces of the respective image bearing members 5A, 5B, 5C and 5D so that the image forming units are prepared for the next image forming operations.

The sheet feeding system 3 of FIG. 1 includes a transfer sheet (not shown) in a sheet feeding cassette (not shown). The transfer sheet is fed from the sheet feeding cassette and is conveyed to the registration rollers 7. The registration rollers 7 stop and feed the transfer sheet in synchronization with a movement of the overlaid color toner image towards a transfer area formed between the intermediate transfer belt 4 and the secondary transfer roller 8. The secondary transfer roller 8 is applied with an adequate predetermined transfer voltage having a polarity opposite to the overlaid color toner image on the intermediate transfer belt 4. Thus, the overlaid color toner image is transferred onto the transfer sheet.

The transfer sheet that has the overlaid color toner image thereon is conveyed further upward and passes the fixing unit 9. The fixing unit 9 fixes the overlaid color toner image to the transfer sheet by applying heat and pressure. After the transfer sheet passes the fixing unit 9, the transfer sheet is discharged to a sheet discharging part 12 provided at the upper location of the background color laser printer 1. A belt cleaning unit (not shown) scrapes the surface of the intermediate transfer belt 4 and removes residual toner adhering onto the surface of the intermediate transfer belt 4.

Referring to FIG. 2, a structure of the optical writing apparatus 2 included in the background color laser printer 1 is described.

In FIG. 2, the optical writing apparatus 2 includes four light source units (not shown), a polygon mirror wheel 62 and associated optical components. The optical writing apparatus 2 is encased by an optical housing 50.

The four light source units emit the laser beams L1, L2, L3 and L4 towards the polygon mirror wheel 62.

The polygon mirror wheel 62 is an optical deflector having a double-stage structure including mirrors 62A and 62B. The polygon mirror wheel 62 distributes the laser beams L1, L2, L3 and L4 emitted from the respective light source units symmetrically in two directions for deflecting and scanning the laser beams L1, L2, L3 and L4.

The optical components include two f-theta lenses 63 and 64, imaging lenses 69, 70, 71 and 72, which are also referred to as toroidal lenses, first deflecting mirrors 65, 66, 67 and 68, second deflecting mirrors 73, 74, 75 and 76, and third deflecting mirrors 77, 78, 79 and 80. Each of the f-theta lenses 63 and 64 has a vertical double-layer structure having an upper layer and a lower layer. The optical components direct the laser beams L1, L2, L3 and L4 arranged symmetrically in the above-described two directions with respect to the polygon mirror wheel 62 and direct the laser beams L1, L2, L3 and L4 deflected onto the surfaces of the respective image bearing members 5A, 5B, 5C and 5D so as to form the respective electrostatic latent images thereon.

The optical housing 50 has a flat-box-shaped structure which is hermetically closed, and includes a base plate 50A and a side plate 50B. The base plate 50A is located to a bottom portion of the optical housing 50 and mounts the optical components thereon. The side plate 50B has a shape of a frame surrounding a circumference of the base plate 50A, which forms a tray-like shape. The polygon mirror wheel 62 is disposed in an approximately central portion of the base plate 50A of the optical housing 50, and the optical components as previously described are disposed in the optical housing 50. A top cover 87 is provided at a top portion of the optical housing 50. The top cover 87 has four openings provided with dust-proof glasses 81, 82, 83 and 84 for passing the respective laser beams L1, L2, L3 and L4.

The optical writing apparatus 2 performs image writing through the following operations.

An image is input to a document reading apparatus, such as a scanner (not shown), or an image data output system, such as a personal computer, a word processor and a receiving portion of a facsimile machine, is separated into different color image data. The different color image data is converted into respective color image signals for driving the respective light source units. After the conversion of the color image signals, light sources in the respective light source units, such as semiconductor lasers (LD), are driven to emit the laser beams L1, L2, L3 and L4. The laser beams L1, L2, L3 and L4 emitted from the respective light source units pass through cylindrical lenses (not shown) for correcting an optical face tangle error and reach the polygon mirror 62 directly or after reflected by mirrors (not shown). The laser beams L1, L2, L3 and L4 are deflected in the symmetrical directions by the polygon mirror wheel 62 with the mirrors 62A and 62B which are rotated by at a uniform velocity by an electrical motor (not shown).

As described above, the polygon mirror wheel 62 of FIG. 2 includes the mirrors 62A and 62B having the double-stage structure in which the mirrors 62A and 62B are placed as layers. The mirror 62A deflects the laser beams L1 and L4 and the mirror 62B deflects the laser beams L2 and L3. As an alternative, a single-stage axially longer polygon mirror may achieve a same performance as the double-stage polygon mirror.

After being deflected by the mirrors 62A and 62B of the polygon mirror wheel 62 in two directions, the light beams L1 and L2 pass through the f-theta lens 63 and the light beams L3 and L4 pass through the f-theta lens 64. The light beam L1 deflected by the mirror 62A of the polygon mirror wheel 62 passes through the upper layer of the f-theta lens 63 and the imaging lens 69, is reflected by the first mirror 62, the second mirror 73, the third mirror 77 and then passes through the dust-proof glass 81 to irradiate the image bearing member 5A. The light beam L2 deflected by the mirror 62B passes through the lower layer of the f-theta lens 63, is reflected by the first mirror 66, passes through the imaging lens 70, is reflected by the second mirror 74 and the third mirror 78, and then passes through the dust-proof glass 82 to irradiate the image bearing member 5B. The light beam L3 deflected by the mirror 62B passes through the lower layer of the f-theta lens 64, is reflected by the first mirror 67, passes through the imaging lens 71, is reflected by the second mirror 75 and the third mirror 79, and then passes through the dust-proof glass 83 to the image bearing member 5C. The light beam L4 deflected by the mirror 62A of the polygon mirror wheel 62 passes through the upper layer of the f-theta lens 64 and the imaging lens 72, is reflected by the first mirror 68, the second mirror 76, the third mirror 80 and then passes through the dust-proof glass 84 to irradiate the image bearing member 5D.

In an image forming apparatus including the optical writing apparatus 2 as described above, the polygon mirror wheel 62 is arranged in a vicinity of the f-theta lenses 63 and 64. In a case where the f-theta lenses 63 and 64 are formed by a resin material, heat generated by rotation of the polygon mirror wheel 62 may deteriorate optical characteristics of the f-theta lenses 63 and 64. The deterioration of the f-theta lenses 63 and 64 may erroneously vary speeds of writing images on the surfaces of the respective image bearing members. As a result, scales of the respective images may change. This is mainly caused by heat produced by the rotation of the polygon motor which drives the polygon mirror wheel 62. When the motor of the polygon mirror wheel 62 is controlled or rotated, heat is generated. The heat flows in an air stream generated by rotation of the polygon mirror wheel 62 to hit against the f-theta lenses 63 and 64. At this time, one of the f-theta lenses 63 and 64 is disposed to a position closer than the other to a heat source located upstream of heated air and the f-theta lenses 63 and 64 symmetrically disposed to two different directions are applied with different temperatures of the air stream. Therefore, the temperature change of the f-theta lenses 63 and 64 are not identical. When the f-theta lenses 63 and 64 are warmed up, their optical characteristics may change and the f-theta lenses 63 and 64 may have different copy scales in the main scanning direction due to thermal expansion. Thus, a writing scale may change and a position of writing an image may also change because of heat generated by the polygon mirror wheel 62 and its electrical motor, resulting in deterioration in image quality.

SUMMARY OF THE INVENTION

The present invention has been made in view of the above circumstances. It is an object of the present invention to provide a novel image forming apparatus capable of preventing image quality deterioration induced by a heat from an optical deflector by insulating f-theta lenses from the optical deflector.

It is another object of the present invention to provide a novel optical writing apparatus included in the novel image forming apparatus.

In one exemplary embodiment, a novel image forming apparatus includes an image forming apparatus which includes an image bearing member having a photosensitive surface and an optical writing apparatus generating a laser beam modulated according to image data. The optical writing apparatus includes a housing, an optical deflector configured to rotate to deflect the laser beam, an f-theta lens configured to correct the laser beam deflected by the optical deflector and to transmit a corrected laser beam towards the image bearing member, and a separator configured to separate an inside space of the housing into at least two sections including a first section in which the optical deflector is mounted and a second section in which the f-theta lens is mounted, the separator including a heat resistant transparent plate disposed at a position of crossing passage of the laser beam between the optical deflector and the f-theta lens.

Further, in one exemplary embodiment, a novel method of manufacturing a novel image forming apparatus may include the steps of arranging an image bearing member having a photosensitive surface, providing a housing for an optical writing apparatus generating a laser beam modulated according to image data, separating an inside space of the housing into at least two sections including a first section in which the optical deflector is mounted and a second section in which the f-theta lens is mounted, arranging a heat resistant transparent plate at a position of crossing passage of the laser beam between the optical deflector and the f-theta lens, arranging an optical deflector configured to rotate for deflecting the laser beam, and positioning an f-theta lens configured to correct the laser beam deflected by the optical deflector and to transmit a corrected laser beam towards the image bearing member.

In one exemplary embodiment, another novel image forming apparatus includes a plurality of image bearing members each having a photosensitive surface and an optical writing apparatus generating a plurality of laser beams modulated according to image data. The optical writing apparatus includes a housing, an optical deflector configured to rotate for deflecting a part of the plurality of laser beams in a first direction and a rest of the plurality of laser beams in a second direction symmetrically opposite to the first direction, at least two f-theta lenses configured to correct the plurality of laser beams deflected by the optical deflector and to transmit a plurality of corresponding corrected laser beams towards the plurality of image bearing members, the at least two f-theta lenses including first and second f-theta lenses disposed at respective places oppositely located in the first and second directions, respectively, relative to the optical deflector, and a separator configured to separate an inside space of the housing into at least two sections including a first section in which the optical deflector is mounted and a second section in which the first and second f-theta lenses are mounted, the separator including a heat resistant transparent plate disposed at a position of crossing passage of one part of the plurality of laser beams between the optical deflector and the first f-theta lens and another heat resistant transparent plate disposed at a position of crossing passage of the rest of the plurality of laser beams between the optical deflector and the second f-theta lens.

The housing may be a flat box, and the first section may be located at an upper side of the housing and the second section may be located at a lower side of the housing.

The first section may include a concave portion at an approximately central portion thereof protruding downward to the second section for placing the optical deflector.

The concave portion may be insulated from the second section of the housing with the heat resistant transparent plates.

The heat resistant transparent plates may be arranged tilted away from the optical deflector, expanding the concave portion upward.

The housing may include a resin material.

The first and second f-theta lenses may include a resin material.

The above-described image forming apparatus may further include a top cover member configured to seal the first section.

The top cover member may include a material having heat conductivity which is higher than a material of the housing.

A part of the first section which is located in a vicinity of the concave portion above the second section may include side walls separated from the concave portion.

The above-described image forming apparatus may further include a concave cover member configured to cover the concave portion.

The concave cover member may include a material having a heat conductance which is higher than a material of the housing.

The above-described image forming apparatus may further include a controller configured to control the rotation of the optical deflector.

The controller may be disposed outside of the housing.

Further, in one exemplary embodiment, a novel method of manufacturing an image forming apparatus includes the steps of arranging a plurality of image bearing members each having a photosensitive surface, providing a housing for an optical writing apparatus generating a plurality of laser beams modulated according to image data, separating an inside space of the housing into at least two sections including a first section in which the optical deflector is mounted and a second section in which the first and second f-theta lenses are mounted, arranging heat resistant transparent plates, one plate at a position of crossing passage of one part of the plurality of laser beams between the optical deflector and the first f-theta lens and another plate at a position of crossing passage of the rest of the plurality of laser beams between the optical deflector and the second f-theta lens, arranging an optical deflector configured to deflect one part of the plurality of laser beams in a first direction and a rest of the plurality of laser beams in a second direction, symmetrically opposite to the first direction. The first and second f-theta lenses are then positioned at respective places oppositely located in the first and second directions, respectively, relative to the optical deflector, the first and second f-theta lenses being configured to correct the plurality of laser beams deflected by the optical deflector and to transmit a plurality of corresponding corrected laser beams towards the plurality of image bearing members.

The above-described method may further include the step of sealing the first section by providing a top cover member.

The above-described method may further include the step of covering the concave portion by providing a concave cover member.

The above-described method may further include controlled rotation of the optical deflector by a controller.

In one exemplary embodiment, a novel optical writing apparatus generating a plurality of laser beams modulated according to image data includes a housing, an optical deflector configured to rotate to deflect part of the plurality of laser beams in a first direction and the rest of the plurality of laser beams in a second direction, symmetrically opposite to the first direction, at least two f-theta lenses configured to correct the plurality of laser beams deflected by the optical deflector and to transmit a plurality of corresponding corrected laser beams towards the plurality of image bearing members, the at least two f-theta lenses including first and second f-theta lenses disposed at respective places oppositely located in the first and second directions, respectively, relative to the optical deflector, and a separator configured to separate an inside space of the housing into at least two sections including a first section in which the optical deflector is mounted and a second section in which the first and second f-theta lenses are mounted, the separator including a heat resistant transparent plate disposed at a position of crossing passage of one part of the plurality of laser beams between the optical deflector and the first f-theta lens and another heat resistant transparent plate disposed at a position of crossing passage of the rest of the plurality of laser beams between the optical deflector and the second f-theta lens.

The above-described optical writing apparatus may further include a top cover member configured to seal the first section.

The above-described optical writing apparatus may further include a concave cover member configured to cover the concave portion.

The above-described optical writing apparatus may further include a controller configured to control the rotation of the optical deflector.

Further, in one exemplary embodiment, a novel method of manufacturing a novel optical writing apparatus includes the steps of providing a housing for the optical writing apparatus generating a plurality of laser beams modulated according to image data, separating an inside space of the housing into at least two sections including a first section in which the optical deflector is mounted and a second section in which the first and second f-theta lenses are mounted, arranging heat resistant transparent plates, one plate at a position of crossing passage of one part of the plurality of laser beams between the optical deflector and the first f-theta lens and another plate at a position of crossing passage of the rest of the plurality of laser beams between the optical deflector and the second f-theta lens, arranging an optical deflector configured to deflect part of the plurality of laser beams in a first direction and a rest of the plurality of laser beams in a second direction symmetrically opposite to the first direction, and positioning first and second f-theta lenses at respective places oppositely located in the first and second directions, respectively, relative to the optical deflector, the first and second f-theta lenses being configured to correct the plurality of laser beams deflected by the optical deflector and to transmit a plurality of corresponding corrected laser beams towards the plurality of image bearing members.

BRIEF DESCRIPTION OF THE DRAWINGS

A more complete appreciation of the disclosure and many of the resulting advantages thereof will be better understood by reference to the following detailed description when considered in connection with the accompanying drawings, wherein.

DETAILED DESCRIPTION OF THE PREFERRED EMBODIMENTS

Figure 1:
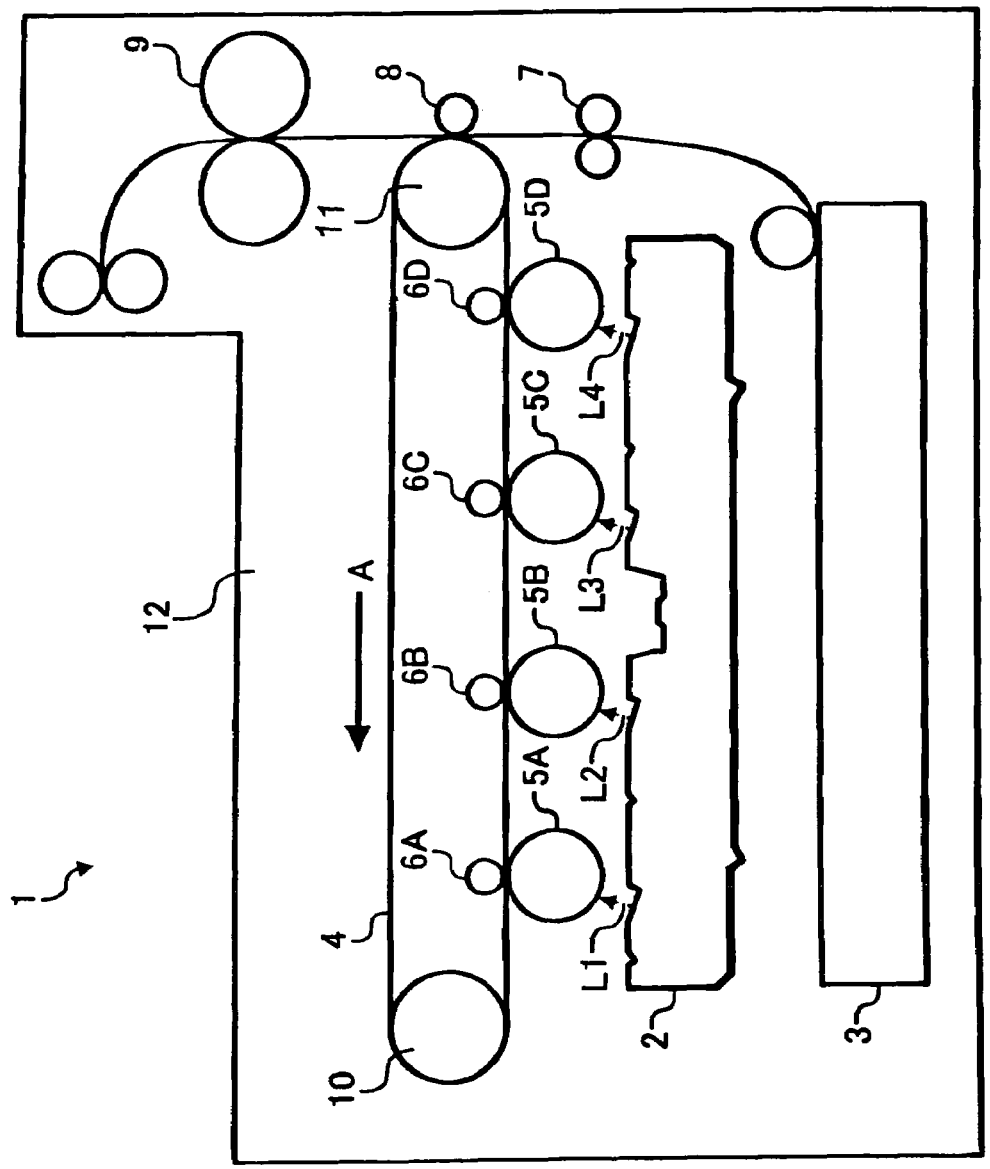
FIG. 1 is a schematic view of a structure of a conventional color laser printer.

In describing preferred embodiments illustrated in the drawings, specific terminology is employed for the sake of clarity. However, the disclosure of this patent specification is not intended to be limited to the specific terminology selected therefore and it is to be understood that each specific element includes all technical equivalents that operate in a similar manner.

Figure 3:
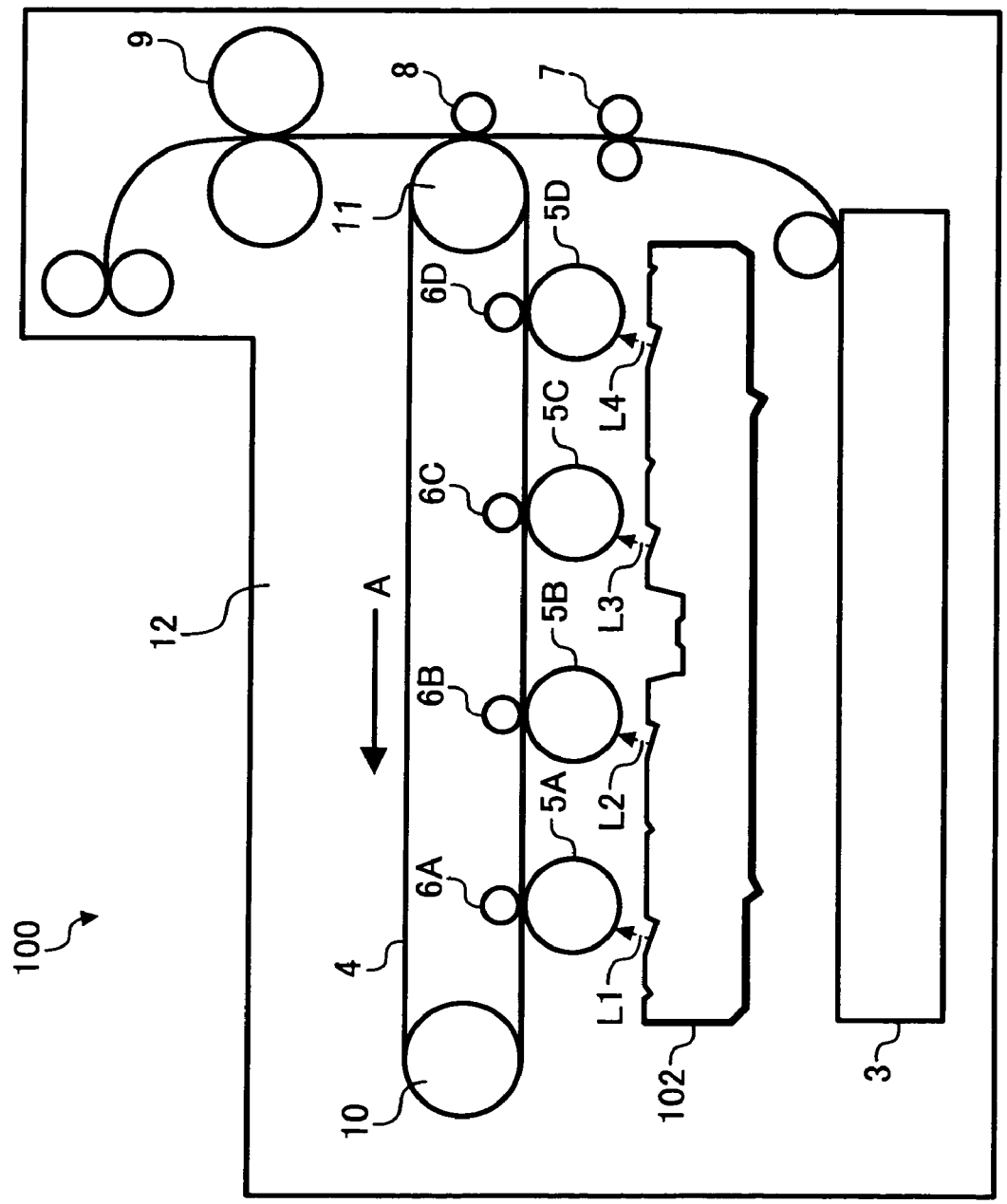
FIG. 3 is a schematic view of a structure of a color laser printer according to an exemplary embodiment of the present invention.

Referring now to the drawings, wherein like reference numerals designate identical or corresponding parts throughout the several views, particularly to FIG. 3, a color laser printer 100 as shown as one example of an electrophotographic image forming apparatus including an optical writing apparatus 102 according to an exemplary embodiment of the present invention is described.

The color laser printer 100 of FIG. 3 has a similar structure to the color laser printer 1 of FIG. 1, except for a structure of the optical writing apparatus 102.

Figure 4:
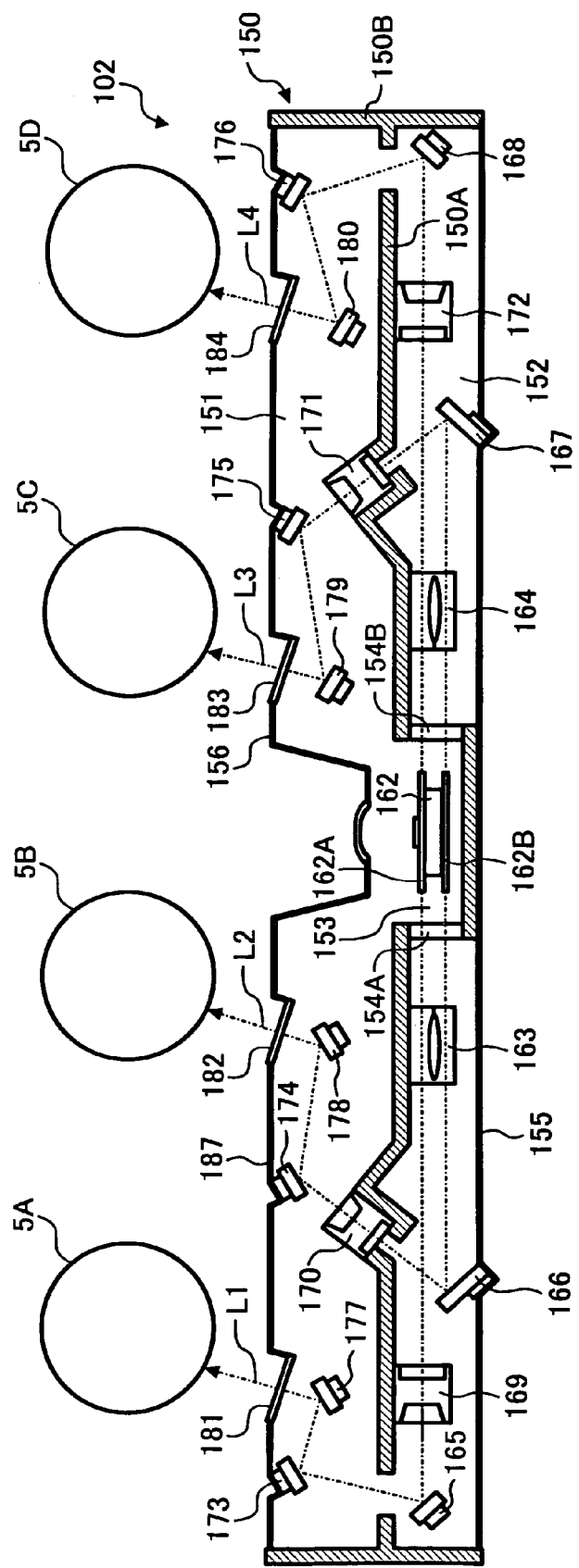
FIG. 4 is a schematic cross-sectional view of an exemplary optical writing apparatus in the color laser printer of FIG. 3.

Referring to FIG. 4, the detailed structure of the optical writing apparatus 102 is described. The optical writing apparatus 102 is provided to a color image forming apparatus having a structure for a tandem operation, such as the color laser printer 1 of FIG. 1 and the color laser printer 100 of FIG. 3, so that laser beams can be emitted from below to upward towards respective image bearing members of respective image forming units.

Figure 2:
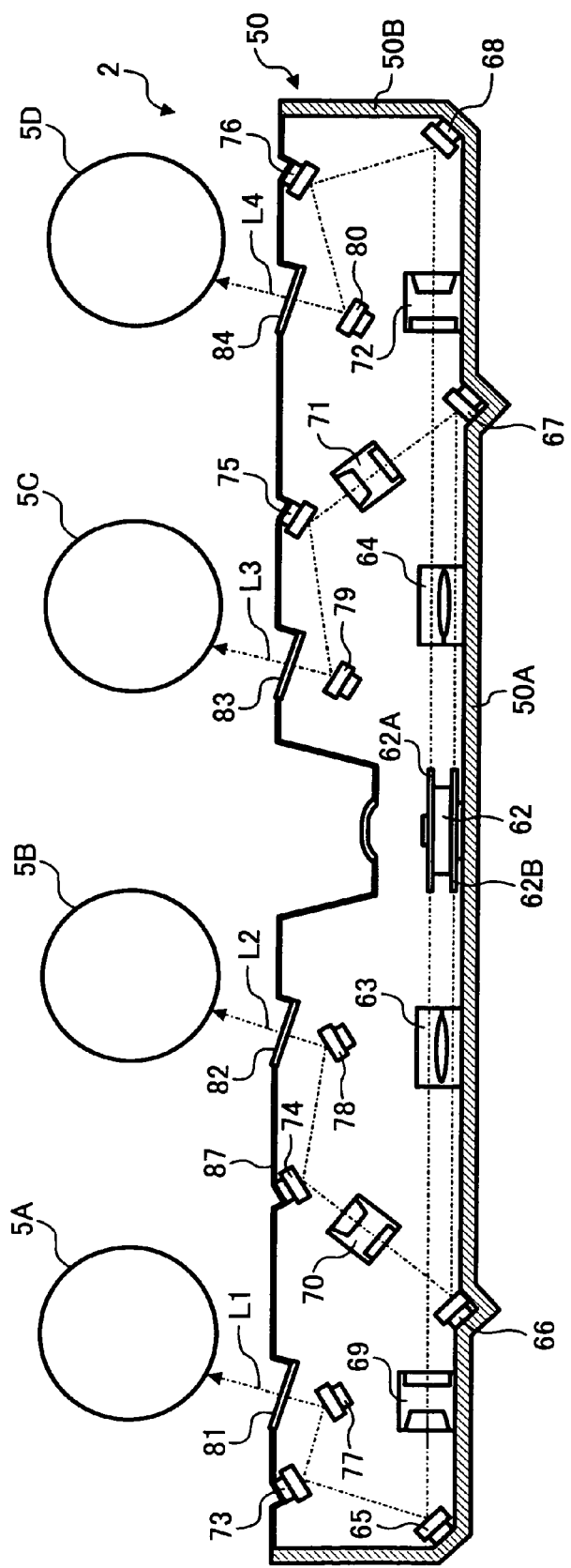
FIG. 2 is a schematic cross-sectional view of a structure of an optical writing apparatus in the color laser printer of FIG. 1.

The optical writing apparatus 102 of FIG. 4 has a structure similar to the optical writing apparatus 2 of FIG. 2, except for a separation plate 150A of an optical housing 150.

In the optical housing 150, the separation plate 150A possesses greater rigidity to function as a main frame of the optical housing 150 as the base plate 50A does and is arranged at an approximately central portion of a side plate 150B to vertically separate the optical housing 150 into two sections such that a cross-sectional view of the optical housing 150 is framed as an approximately H-shaped structure. That is, the separation plate 150A of the optical housing 150 is placed between an upper section 151 and a lower section 152 of the optical writing apparatus 102. The optical writing apparatus 102 further includes a top cover 187 and a bottom cover 155 of the optical housing 150.

In the upper section 151, the separation plate 150A has a hollow 153 at an approximately central position thereof. The hollow 153 downwardly extends to the bottom cover 155 of the lower section 152 to place a polygon mirror 162 having a double-stage structure therein. The hollow 153 includes side walls 154A and 154B for separating the hollow 153 from the lower section 152. The side walls 154A and 154B have respective portions made of transparent dust-proof and/or sound-proof glasses so that the laser beams L1, L2, L3 and L4 deflected by the polygon mirror wheel 62 pass through the side walls 154A and 154B. The upper section 151 further includes imaging lenses 170 and 171, second deflecting lenses 173, 174, 175 and 176, and third deflecting lenses 177, 178, 179 and 180. The top cover 187 includes dust-proof glasses 181, 182, 183 and 184 to pass through the respective laser beams L1, L2, L3 and L4 to irradiate each surface of the respective image bearing members 5A, 5B, 5C and 5D.

In the lower section 152, f-theta lenses 163 and 164 are mounted on a bottom side of the separation plate 150A so that the f-theta lenses 163 and 164 are oppositely placed to each other having the polygon mirror wheel 162 there between. The lower section 152 further includes imaging lenses 169 and 172, first deflecting mirrors 165, 166, 167 and 168. The optical housing 150 and the f-theta lenses 163 and 164 are formed by resin molding.

In the optical writing apparatus 102, the polygon mirror wheel 162 and the f-theta lenses 163 and 164 are provided to different sections separated by the separation plate 150A of the optical housing 150. That is, the polygon mirror wheel 162 is disposed in the upper section 151 and the f-theta lenses 163 and 164 are disposed in the lower section 152. In a case where a stream of heated air is generated in the upper section 151 by rotation of the polygon mirror wheel 162, the heated air flow does not directly hit against the f-theta lenses 163 and 164 disposed in the lower section 152. Further, in a case where the heated air flow generated by the rotation of the polygon mirror wheel 162 has a temperature difference, optical characteristics are not changed significantly by heat. Therefore, temperature change of the f-theta lenses 163 and 164 is restrained and deterioration in image quality is reduced or prevented.

An entire portion of the bottom cover 155 is preferably made of a metal plate having a heat conductance which is higher than the optical housing 150. With the above-described bottom cover 155, a heat in the lower section 152 of the optical housing 150 is uniformly distributed so that the f-theta lenses 163 and 164 are substantially equally warmed. As a result, this reduces or prevents color deviation which is caused when the f-theta lenses 163 and 164 are distorted by heat generated by the polygon mirror wheel 162.

The heat generated by the polygon mirror wheel 162 is distributed in the upper section 151 of the optical housing 150. To release the heat, the top cover 187 may have an entire portion or at least a portion just above the polygon mirror wheel 162 made of a metal cover 156 having a heat conductance which is higher than the optical housing 150. With the above-described top cover 187 having the metal cover 156 in part, a temperature in the upper section 151 will not be drastically increased.

Figure 5:
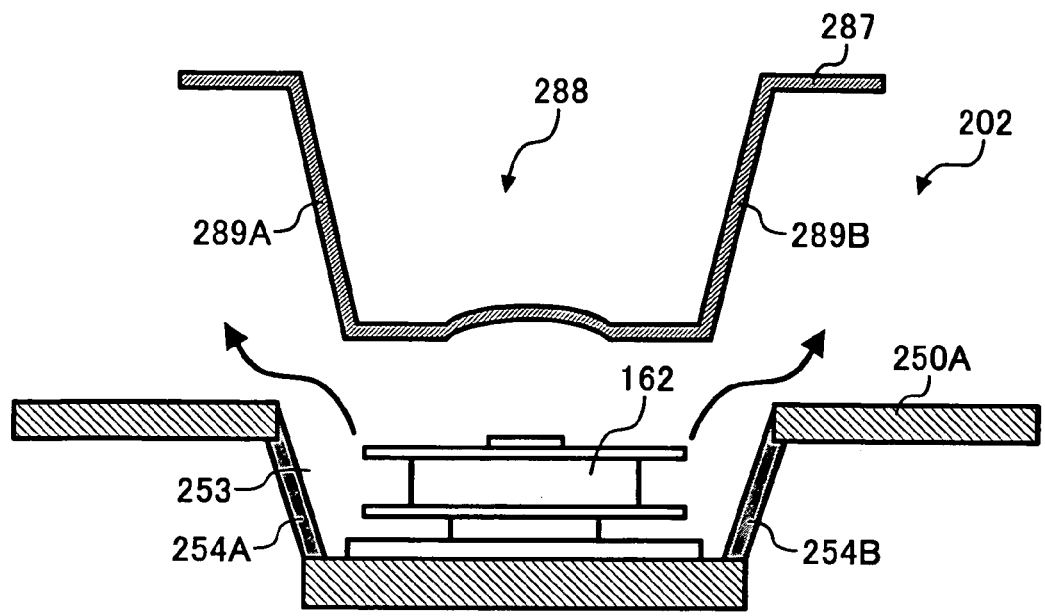
FIG. 5 is a schematic cross-sectional view of an exemplary hollow space associated with a heated-air flow around an optical deflector in the optical writing apparatus of FIG. 4.

Referring to FIG. 5, a structure of an optical writing apparatus 202 is described according to another exemplary embodiment of the present invention. The optical writing apparatus 202 of FIG. 5 has a similar structure to the optical writing apparatus 102 of FIG. 4, except for a shape of a space or hollow 253.

In FIG. 5, the optical writing apparatus 202 includes the hollow 253 formed on a separation plate 250A so that the polygon mirror wheel 162 is disposed therein. The hollow 253 of the separation plate 250A includes side walls 254A and 254B which are arranged oppositely on both sides of the polygon mirror wheel 162. The side walls 254A and 254B are tilted away from the polygon mirror wheel 162 so that a distance between the side walls 254A and 254B becomes greater as the side walls 254A and 254B are extending upward.

A top cover 287 of the optical writing apparatus 202 also has a hollow 288 corresponding to the hollow 253 of the separation plate 250A. The hollow 288 of the top cover 287 includes side walls 289A and 289B which are arranged substantially in parallel with the tilted side walls 254A and 254B of the separation plate 250A. The top cover 287 may be made of a heat-conductive metal plate for over an entire portion or at least a portion just above the polygon mirror wheel 162.

In the above-described optical writing apparatus 202, rotation of the polygon mirror wheel 162 generates a stream of heated air. The stream of heated air is dispersed in an upward direction, as indicated by arrows, along the side walls 254A and 254B of the hollow 253 into an upper section of the optical writing apparatus 202. Since the side walls 254A and 254B are tilted, the stream of heated air is dispersed in the upward direction more smoothly, compared to the optical writing apparatus 102 having the side walls 154A and 154B which are arranged in a vertical direction perpendicular to the separation plate 150A. The side walls 254A and 254B can reduce or prevent a heat conductance to the f-theta lenses of FIG. 4 and keep a temperature of heat around the f-theta lenses 163 and 164 stable. Therefore, deterioration in image quality caused by the heat may be reduced or prevented.

Figure 6:
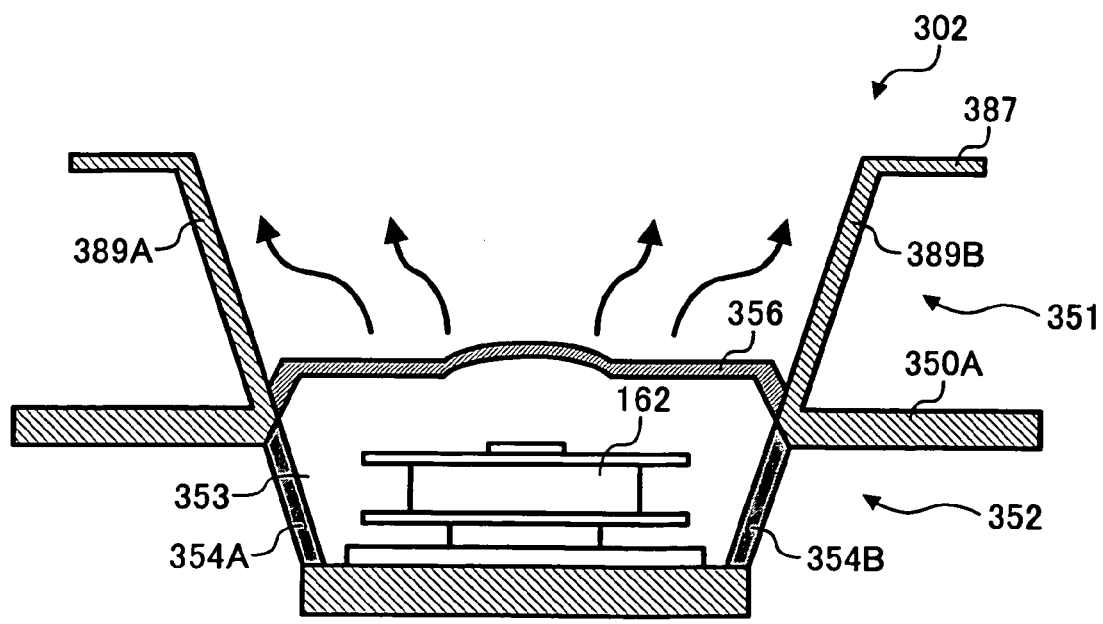
FIG. 6 is a schematic cross-sectional view of another exemplary hollow space associated with a heated-air flow around an optical deflector in the optical writing apparatus of FIG. 4.

Referring now to FIG. 6, a structure of an optical writing system 302 is described according to another exemplary embodiment of the present invention. The optical writing apparatus 302 of FIG. 6 has an identical structure to the optical writing apparatus 102 of FIG. 4, except for a shape of a hollow 353.

In FIG. 6, the optical writing apparatus 302 includes the hollow 353 formed on a separation plate 350A so that the polygon mirror wheel 162 is disposed therein. The hollow 353 of the separation plate 350A includes side walls 354A and 354B which are arranged oppositely on both sides of the polygon mirror wheel 162. The side walls 354A and 354B are tilted so that a distance between the side walls 354A and 354B becomes greater as the side walls 354A and 354B are extending upward. The side walls 354A and 354B of FIG. 6 are made to have a length longer than the side walls 254A and 254B of FIG. 5. A top cover 387 includes side walls 389A and 389B which are tilted by same angles as the side walls 354A and 354B of the separation plate 350A. In this embodiment, the top cover 387 is integrally connected with the separation plate 350A such that the side walls 354A and 354B are arranged in alignment with 389A and 389B, respectively. Two opposite ends of the metal cover 356 are conjoined either with 354A and 354B, and/or with 389A and 389B respectively, at a predetermined height of the hollow 353.

The metal cover 356 covers the hollow 353 over the polygon mirror wheel 162 so that the hollow 353 is hermetically closed and a stream of heated air is not distributed into an upper section 351 as well as a lower section 352 of the optical writing apparatus 302. The metal cover 356 is made of a metal plate having a high heat conductance. With the above-described structure of the optical writing apparatus 302, the stream of heated air is dispersed through the metal cover 356 to an outside of the optical writing apparatus 302. Therefore, the amount of the heated air flow affecting the optical writing section is reduced, more particularly affected on the f-theta lenses 163 and 164 of FIG. 4 is reduced, and as a result, damage to the f-theta lenses 163 and 164 caused by heat can be reduced or prevented.

Figure 7:
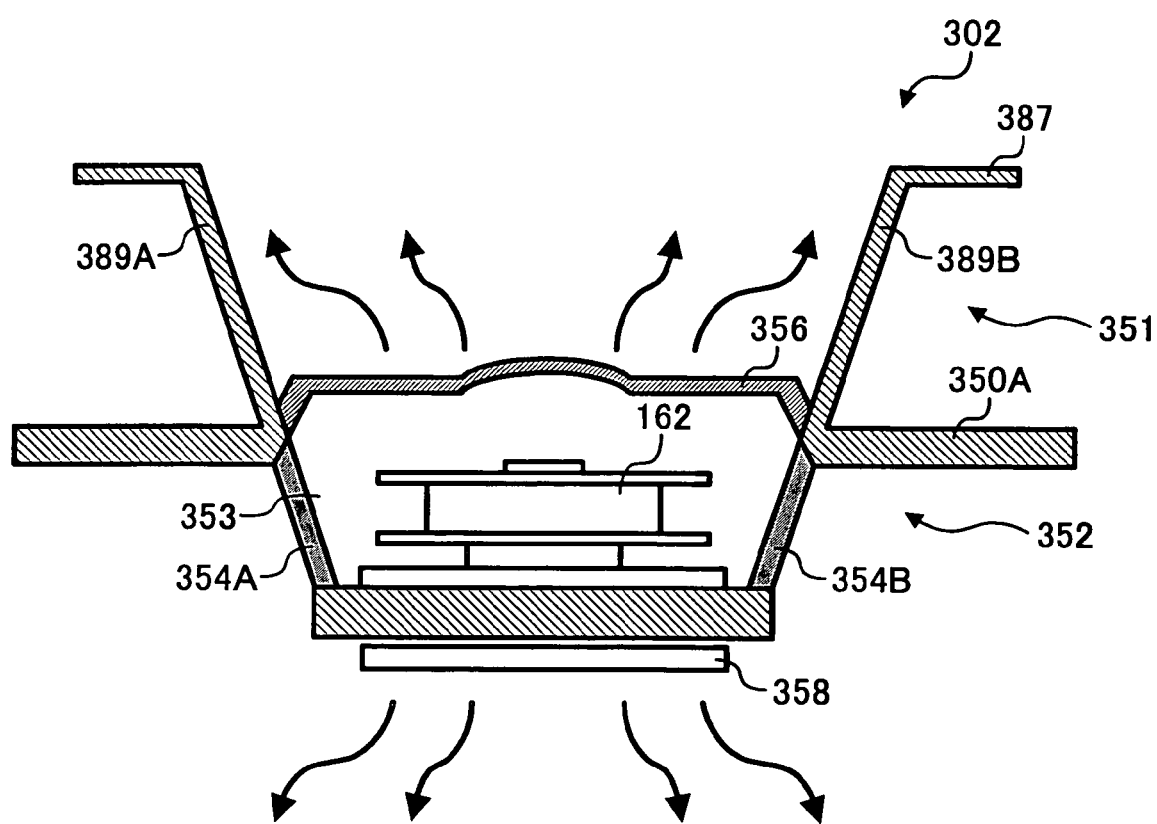
FIG. 7 is a schematic cross-sectional view of another exemplary hollow space associated with a heated-air flow around an optical deflector in the optical writing apparatus of FIG. 6.

Referring to FIG. 7, another structure of the optical writing apparatus 302 is described.

The optical writing apparatus 302 of FIG. 7 further includes a controller 358 for controlling the polygon mirror 362. The controller 358 which is generally disposed in an optical housing of the optical writing apparatus 302 is arranged outside of the optical housing, so as to reduce the heat generated inside the hollow 353.

With the above-described structure, a degree of a temperature in the hollow 353 is not drastically increased and damage to the f-theta lenses 163 and 163 of FIG. 4 are securely reduced.

In FIG. 7, the controller 358 is arranged to a bottom surface of the separation plate 350A. As an alternative, the controller 358 may be arranged to any other place outside the optical housing by connecting a polygon motor (not shown) via a harness or a cable (not shown).

The image forming apparatus according to the present invention has a structure that an optical writing apparatus emits laser beams to irradiate respective image bearing members from under respective image forming units including the respective image bearing members. As an alternative, the optical writing apparatus of the present invention may be applied to an image forming apparatus in which the optical writing apparatus emits laser beams from a side of or from above the respective image bearing members.

Numerous additional modifications and variations are possible in light of the above teachings. It is therefore to be understood that within the scope of the appended claims, the disclosure of this patent specification may be practiced otherwise than as specifically described herein.

What is claimed as new and desired to be secured by Letters Patent of the United States is:

1. An image forming apparatus, comprising:
   an image bearing member having a photosensitive surface; and
   an optical writing apparatus generating a laser beam modulated according to image data, the optical writing apparatus comprising:
   a housing;
   an optical deflector configured to deflect the laser beam;
   a lens configured to correct the laser beam deflected by the optical deflector and to transmit a corrected laser beam towards the image bearing member; and
   a separator configured to separate an inside space of the housing into at least two sections including a first section and a second section,
   wherein the housing includes a flat box with the first and second sections at upper and lower sides thereof, respectively, and the first section includes the optical deflector and the second section includes the lens,
   wherein the first and second sections have a shape in cross-section in which the first section includes a chamber protruding vertically downward at an approximately center thereof and vertically separating the second section into two subsections, and
   wherein the optical deflector is mounted at a bottom of the chamber of the first section.

2. The image forming apparatus according to claim 1, wherein the optical deflector includes a polygon mirror wheel.

3. The image forming apparatus according to claim 1, wherein the lens includes an f-theta lens.

4. The image forming apparatus according to claim 1, wherein the separator comprises a transparent plate disposed at a position to cross a passage of said laser beam between the optical deflector and the lens.

5. An image forming apparatus generating a laser beam according to image data in an enclosure, comprising:
   deflecting means for deflecting the laser beam;
   correcting means for correcting the laser beam deflected by the deflecting means and transmitting the laser beam corrected onto a photosensitive surface disposed outside the enclosure; and
   insulating means for insulating the correcting means from a flow of a heated air produced by the deflecting means,
   wherein the insulating means includes a separator for separating an inside space of the enclosure into at least two sections including first and second sections, and the first section includes the deflecting means and the second section includes the correcting means,
   wherein the enclosure includes a flat box with the first and second sections at upper and lower sides thereof, respectively, and the first and second sections have a shape in cross-section in which the first section includes a chamber protruding vertically downward at an approximately center thereof and vertically separating the second section into two subsections, and
   wherein the deflecting means is mounted at a bottom of the chamber of the first section.

6. The image forming apparatus according to claim 5, wherein the deflecting means includes a polygon mirror wheel.

7. The image forming apparatus according to claim 6, wherein the correcting means includes an f-theta lens.

8. The image forming apparatus according to claim 7, wherein the separator includes a transparent plate disposed at a position to cross a passage of the laser beam between the polygon mirror wheel and the f-theta lens.

9. An image forming method using a laser beam generated according to image data in an enclosure, comprising the steps of:
   deflecting the laser beam;
   insulating a specific optical component from a flow of a heated air produced by the deflecting step; and
   correcting the laser beam, deflected by the deflecting step, with the specific optical component and transmitting the laser beam corrected onto a photosensitive surface disposed outside the enclosure, wherein the insulating step is performed with a separator for separating an inside space of the enclosure into at least two sections including first and second sections, and the deflecting step is performed in the first section and the correcting step is performed in the second section, wherein the enclosure includes a flat box with the first and second sections at upper and lower sides thereof, respectively, and the first and second sections have a shape in cross-section in which the first section includes a chamber protruding vertically downward at an approximately center thereof and vertically separating the second section into two subsections, and wherein the deflecting step is performed at a bottom of the chamber of the first section.

10. The image forming method according to claim 9, wherein the deflecting step is performed with a polygon mirror wheel.

11. The image forming method according to claim 10, wherein the specific optical component includes an f-theta lens.

12. The image forming method according to claim 11, wherein the separator includes a transparent plate disposed at a position of crossing passage of the laser beam between the polygon mirror wheel and the f-theta lens.

13. The image forming method according to claim 12, further comprising:

controlling a rotating operation of the polygon mirror wheel from outside said enclosure.

14. The image forming method according to claim 11, wherein the separator for separating further separates the first section of the inside space of the enclosure from a top side of the enclosure with a top cover.

15. The image forming method according to claim 14, wherein the top cover includes a material having a heat conductance which is higher than a material of the housing.

16. An image forming apparatus, comprising:

a plurality of image bearing members each having a photosensitive surface; and an optical writing apparatus generating a plurality of laser beams modulated according to image data, the optical writing apparatus comprising:

a housing;

an optical deflector configured to deflect a first group of laser beams in a first direction and a second group of laser beams in a second direction symmetrically opposite to the first direction in a same plane;

a plurality of lenses configured to correct and transmit the first and second groups of laser beams deflected by the optical deflector onto the plurality of image bearing members; and a separator configured to separate an inside space of the housing into at least two sections including a first section and a second section, wherein the housing includes a flat box with the first and second sections at upper and lower sides thereof, respectively, and the first section includes the optical deflector and the second section includes the plurality of lenses, wherein the first and second sections have a shape in cross-section in which the first section includes a chamber protruding vertically downward at an approximately center thereof and vertically separating the second section into two subsections, and wherein the optical deflector is mounted at a bottom of the chamber of the first section.

17. The image forming apparatus according to claim 16, wherein the optical deflector includes a polygon mirror wheel.

18. The image forming apparatus according to claim 16, wherein the plurality of lenses includes first and second f-theta lenses, each of which are made of a resin material, and configured to correct and transmit the first and second groups of laser beams, respectively, which are deflected by the optical deflector onto the plurality of said image bearing members.

19. The image forming apparatus according to claim 18, wherein the separator comprises a transparent plate disposed at each one of positions to cross passages of the first group of laser beams between the optical deflector and the first f-theta lens and the second group of laser beams between the optical deflector and the second f-theta lens.

20. The image forming apparatus according to claim 19, wherein the optical writing apparatus further comprises a chamber cover configured to cover the chamber from a top side.

21. The image forming apparatus according to claim 20, wherein the chamber cover includes a material having a heat conductance which is higher than a material of the housing.

22. The image forming apparatus according to claim 21, further comprising:

a controller configured to control a rotating operation of the polygon mirror wheel and arranged outside the optical writing apparatus.

23. An image forming apparatus, comprising:

a plurality of image bearing members each having a photosensitive surface; and an optical writing apparatus generating a plurality of laser beams modulated according to image data, the optical writing apparatus comprising:

a housing;

an optical deflector configured to deflect a first group of laser beams in a first direction and a second group of laser beams in a second direction symmetrically opposite to the first direction in a same plane;

a plurality of lenses configured to correct and transmit the first and second groups of laser beams deflected by the optical deflector onto the plurality of image bearing members; and a separator configured to separate an inside space of the housing into at least two sections including a first section in which the optical deflector is mounted and a second section in which the plurality of lenses are mounted, wherein the housing is made of a resin material and includes a flat box with the first and second sections at upper and lower sides thereof, respectively, and the first and second sections have a shape in cross-section in which the first section includes a chamber protruding vertically downward at an approximately center thereof and vertically separating the second section into two subsections, and wherein the optical deflector is mounted at a bottom of the chamber of the first section.

24. The image forming apparatus according to claim 23, wherein the second section and the chamber are insulated from each other with transparent plates of the separator.

25. The image forming apparatus according to claim 24, wherein the transparent plates are arranged such that a lateral cross-sectional area of the chamber increases with increase in height of the chamber.

26. An image forming apparatus, comprising:

a plurality of image bearing members each having a photosensitive surface; and an optical writing apparatus generating a plurality of laser beams modulated according to image data, the optical writing apparatus comprising:
  a housing;
  an optical deflector configured to deflect a first group of laser beams in a first direction and a second group of laser beams in a second direction symmetrically opposite to the first direction in a same plane;
  a plurality of lenses configured to correct and transmit the first and second groups of laser beams deflected by the optical deflector onto the plurality of image bearing members; and
  a separator configured to separate an inside space of the housing into at least two sections including a first section in which the optical deflector is mounted and a second section in which the plurality of lenses are mounted,
  wherein the plurality of lenses includes first and second f-theta lenses, each of which are made of a resin material, and configured to correct and transmit the first and second groups of laser beams, respectively, which are deflected by the optical deflector onto the plurality of said image bearing members,
  wherein the separator comprises a transparent plate disposed at each one of positions to cross passages of the first group of laser beams between the optical deflector and the first f-theta lens and the second group of laser beams between the optical deflector and the second f-theta lens, and
  wherein the separator includes side walls arranged to extend upward from the transparent plates to insulate the first section from a space over a chamber such that a lateral cross-sectional area of the space over the chamber between the side walls increases with increase in height of the space over the chamber.

27. An image forming apparatus generating a plurality of laser beams according to image data in an enclosure, comprising:
  deflecting means for deflecting a first group of the laser beams in a first direction and a second group of laser beams in a second direction symmetrically opposite to the first direction in a same plane;
  insulating means for insulating a plurality of lenses from a flow of a heated air produced by the deflecting means; and
  correcting means for correcting the first and second groups of laser beams, deflected by the deflecting means, with the plurality of lenses and transmitting the first and second groups of laser beams corrected onto a plurality of photosensitive surfaces disposed outside the enclosure,
  wherein the insulating means includes a separator for separating an inside space of the enclosure into at least two sections including first and second sections, and the first section includes the deflecting means and the second section includes the correcting means,
  wherein the enclosure includes a flat box with the first and second sections at upper and lower sides thereof, respectively, and the first and second sections have a shape in cross-section in which the first section includes a chamber protruding vertically downward at an approximately center thereof and vertically separating the second section into two subsections, and
  wherein the deflecting means is mounted at a bottom of the chamber of the first section.

28. The image forming apparatus according to claim 27, wherein the deflecting means includes a polygon mirror wheel.

29. The image forming apparatus according to claim 28, wherein the plurality of lenses includes first and second f-theta lenses, each of which are made of a resin material, configured to correct and transmit the first and second groups of laser beams, respectively, which are deflected by the polygon mirror wheel onto the plurality of photosensitive surfaces.

30. The image forming apparatus according to claim 29, wherein the separator comprises a transparent plate disposed at each one of positions to cross passages of the first group of laser beams between the polygon mirror wheel and the first f-theta lens and the second group of laser beams between the polygon mirror wheel and the second f-theta lens.

31. The image forming apparatus according to claim 29, wherein the optical writing apparatus further comprises a chamber cover configured to cover the chamber from a top side.

32. The image forming apparatus according to claim 31, wherein the chamber cover includes a material having a heat conductance which is higher than a material of the enclosure.

33. The image forming apparatus according to claim 32, further comprising a step of:
  controlling externally a rotating operation of the polygon mirror wheel.

34. The image forming apparatus according to claim 28, wherein the optical writing apparatus further comprises a top cover configured to seal the first section of the inside space of the enclosure from a top side of the enclosure.

35. The image forming apparatus according to claim 34, wherein the top cover includes a material having a heat conductance which is higher than a material of the enclosure.

36. An image forming apparatus generating a plurality of laser beams according to image data in an enclosure, comprising:
  deflecting means for deflecting a first group of the laser beams in a first direction and a second group of laser beams in a second direction symmetrically opposite to the first direction in a same plane;
  insulating means for insulating a plurality of lenses from a flow of a heated air produced by the deflecting means; and
  correcting means for correcting the first and second groups of laser beams, deflected by the deflecting means, with the plurality of lenses and transmitting the first and second groups of laser beams corrected onto a plurality of photosensitive surfaces disposed outside the enclosure,
  wherein the deflecting means includes a polygon mirror wheel,
  wherein the plurality of lenses includes first and second f-theta lenses, each of which are made of a resin material, configured to correct and transmit the first and second groups of laser beams, respectively, which are deflected by the polygon mirror wheel onto the plurality of photosensitive surfaces,
  wherein the insulating means includes a separator for separating an inside space of the enclosure into at least two sections including a first section in which the polygon mirror wheel is mounted and a second section in which the first and second f-theta lenses are mounted, wherein the separator comprises a transparent plate disposed at each one of positions to cross passages of the first group of laser beams between the polygon mirror wheel and the first f-theta lens and the second group of laser beams between the polygon mirror wheel and the second f-theta lens, and wherein the enclosure made of a resin material and includes a flat box with the first and second sections at upper and lower sides thereof, respectively, and the first and second sections have a shape in cross-section in which the first section includes a chamber protruding vertically downward at an approximately center thereof and vertically separating the second section into two subsections, and wherein the polygon mirror wheel is mounted at a bottom of the chamber of the first section.

37. The image forming apparatus according to claim 36, wherein the second section and the chamber are insulated from each other with the transparent plates of the separator.

38. The image forming apparatus according to claim 37, wherein the transparent plates are arranged such that a lateral cross-sectional area of the chamber increases with increase in height of the chamber.

39. An image forming apparatus generating a plurality of laser beams according to image data in an enclosure, comprising:

deflecting means for deflecting a first group of the laser beams in a first direction and a second group of laser beams in a second direction symmetrically opposite to the first direction in a same plane;

insulating means for insulating a plurality of lenses from a flow of a heated air produced by the deflecting means; and correcting means for correcting the first and second groups of laser beams, deflected by the deflecting means, with the plurality of lenses and transmitting the first and second groups of laser beams corrected onto a plurality of photosensitive surfaces disposed outside the enclosure, wherein the deflecting means includes a polygon mirror wheel, wherein the plurality of lenses includes first and second f-theta lenses, each of which are made of a resin material, configured to correct and transmit the first and second groups of laser beams, respectively, which are deflected by the polygon mirror wheel onto the plurality of photosensitive surfaces, wherein the insulating means includes a separator for separating an inside space of the enclosure into at least two sections including a first section in which the polygon mirror wheel is mounted and a second section in which the first and second f-theta lenses are mounted, wherein the separator comprises a transparent plate disposed at each one of positions to cross passages of the first group of laser beams between the polygon mirror wheel and the first f-theta lens and the second group of laser beams between the polygon mirror wheel and the second f-theta lens;

wherein the separator includes side walls arranged to extend upward from the transparent plates to insulate the first section from a space over a chamber such that a lateral cross-sectional area of the space over the chamber between the side walls increases with increase in height of the space over the chamber.

40. An image forming method, comprising the steps of:
providing an enclosure in which a plurality of laser beams are generated according to image data;

deflecting a first group of the laser beams in a first direction and a second group of laser beams in a second direction symmetrically opposite to the first direction in a same plane;

insulating a plurality of lenses from a flow of a heated air produced by the deflecting step;

correcting the first and second groups of laser beams, deflected by the deflecting step, with the plurality of lenses; and transmitting the first and second groups of laser beams corrected onto a plurality of photosensitive surfaces disposed outside the enclosure, wherein the insulating step is performed with a separator for separating an inside space of the enclosure into at least two sections including first and second sections, and the deflecting step is performed in the first section and the correcting step is performed in the second section, wherein the enclosure includes a flat box with the first and second sections at upper and lower sides thereof, respectively, and the first and second sections have a shape in cross-section in which the first section includes a chamber protruding vertically downward at an approximately center thereof and vertically separating the second section into two subsections, and wherein the deflecting step is performed at a bottom of the chamber of the first section.

41. The image forming method according to claim 40, wherein the deflecting step uses a polygon mirror wheel.

42. The image forming method according to claim 41, wherein the correcting step uses the plurality of lenses, each of which are made of a resin material, includes first and second f-theta lenses configured to correct and transmit the first and second groups of laser beams.

43. The image forming method according to claim 42, wherein the separator comprises a transparent plate disposed at each one of positions to cross passages of the first group of laser beams between the polygon mirror wheel and the first f-theta lens and the second group of laser beams between the polygon mirror wheel and the second f-theta lens.

44. The image forming method according to claim 42, wherein the enclosure further includes a chamber cover configured to cover the chamber from a top side.

45. The image forming method according to claim 44, wherein the chamber cover includes a material having a heat conductance which is higher than a material of the enclosure.

46. The image forming method according to claim 41, wherein the enclosure further includes a top cover configured to seal the first section of the inside space of the housing from a top side of the enclosure.

47. The image forming method according to claim 46, wherein the top cover includes a material having a heat conductance which is higher than a material of the enclosure.

48. An image forming method, comprising the steps of:
providing an enclosure in which a plurality of laser beams are generated according to image data;

deflecting a first group of the laser beams in a first direction and a second group of laser beams in a second direction symmetrically opposite to the first direction in a same plane;

insulating a plurality of lenses from a flow of a heated air produced by the deflecting step;

correcting the first and second groups of laser beams, deflected by the deflecting step, with the plurality of lenses; and transmitting the first and second groups of laser beams corrected onto a plurality of photosensitive surfaces disposed outside the enclosure, wherein the deflecting step uses a polygon mirror wheel, wherein the correcting step uses the plurality of lenses, each of which are made of a resin material, includes first and second f-theta lenses configured to correct and transmit the first and second groups of laser beams, wherein the insulating step uses a separator for separating an inside space of the enclosure into at least two sections including a first section in which the polygon mirror wheel is mounted and a second section in which the first and second f-theta lenses are mounted, wherein the separator comprises a transparent plate disposed at each one of positions to cross passages of the first group of laser beams between the polygon mirror wheel and the first f-theta lens and the second group of laser beams between the polygon mirror wheel and the second f-theta lens, and wherein the enclosure is made of a resin material and includes a flat box with the first and second sections at upper and lower sides thereof, respectively, and the first and second sections have a shape in cross-section in which the first section includes a chamber protruding vertically downward at an approximately center thereof and vertically separating the second section into two subsections, and wherein the polygon mirror wheel is mounted at a bottom of the chamber of the first section.

49. The image forming method according to claim 48, wherein the second section and the chamber are insulated from each other with the transparent plates of the separator.

50. The image forming method according to claim 49, wherein the transparent plates are arranged such that a lateral cross-sectional area of the chamber increases with increase in height of the chamber.

51. An image forming method, comprising the steps of:
providing an enclosure in which a plurality of laser beams are generated according to image data;
deflecting a first group of the laser beams in a first direction and a second group of laser beams in a second direction symmetrically opposite to the first direction in a same plane;
insulating a plurality of lenses from a flow of a heated air produced by the deflecting step;
correcting the first and second groups of laser beams, deflected by the deflecting step, with the plurality of lenses; and
transmitting the first and second groups of laser beams corrected onto a plurality of photosensitive surfaces disposed outside the enclosure,
wherein the deflecting step uses a polygon mirror wheel,
wherein the correcting step uses the plurality of lenses, each of which are made of a resin material, includes first and second f-theta lenses configured to correct and transmit the first and second groups of laser beams,
wherein the insulating step uses a separator for separating an inside space of the enclosure into at least two sections including a first section in which the polygon mirror wheel is mounted and a second section in which the first and second f-theta lenses are mounted,
wherein the separator comprises a transparent plate disposed at each one of positions to cross passages of the first group of laser beams between the optical deflector and the first f-theta lens and the second group of laser beams between the optical deflector and the second f-theta lens;
wherein the separator includes side walls arranged to extend upward from the transparent plates to insulate the first section from a space over a chamber such that a lateral cross-sectional area of the space over the chamber between the side walls increases with increase in height of the space over the chamber.

52. An optical writing apparatus generating a plurality of laser beams modulated according to image data, comprising:
a housing;
an optical deflector configured to deflect a first group of laser beams in a first direction and a second group of laser beams in a second direction symmetrically opposite to the first direction in a same plane;
a plurality of lenses configured to correct and transmit the first and second groups of laser beams deflected by the optical deflector onto a plurality of photosensitive surfaces disposed outside the housing; and
a separator configured to separate an inside space of the housing into at least two sections including a first section and a second section,
wherein the housing includes a flat box with the first and second sections at upper and lower sides thereof, respectively, and the first section includes the optical deflector and the second section includes the plurality of lenses,
wherein the first and second sections have a shape in cross-section in which the first section includes a chamber protruding vertically downward at an approximately center thereof and vertically separating the second section into two subsections, and
wherein the optical deflector is mounted at a bottom of the chamber of the first section.

53. The optical writing apparatus according to claim 52, wherein the plurality of lenses includes first and second f-theta lenses, each of which are made of a resin material, and configured to correct and transmit the first and second groups of laser beams, respectively, which are deflected by the optical deflector onto the plurality of photosensitive surfaces.

54. The optical writing apparatus according to claim 53, wherein the separator comprises a transparent plate disposed at each one of positions to cross passages of the first group of laser beams between the optical deflector and the first f-theta lens and the second group of laser beams between the optical deflector and the second f-theta lens.

55. The optical writing apparatus according to claim 52, further comprising:
a top cover configured to seal the first section of the inside space of the housing from a top side of the housing, wherein the top cover includes a material having a heat conductance which is higher than a material of the housing.

56. An optical writing apparatus generating a plurality of laser beams modulated according to image data, comprising:
a housing;
an optical deflector configured to deflect a first group of laser beams in a first direction and a second group of laser beams in a second direction symmetrically opposite to the first direction in a same plane;
a plurality of lenses configured to correct and transmit the first and second groups of laser beams deflected by the optical deflector onto a plurality of photosensitive surfaces disposed outside the housing; and a separator configured to separate an inside space of the housing into at least two sections including a first section in which the optical deflector is mounted and a second section in which the plurality of lenses are mounted, wherein the separator comprises a transparent plate disposed at each one of positions to cross passages of the first group of laser beams between the optical deflector and the first f-theta lens and the second group of laser beams between the optical deflector and the second f-theta lens;

wherein the housing made of a resin material and includes a flat box with the first and second sections at upper and lower sides thereof, respectively, and the first and second sections have a shape in cross-section in which the first section includes a chamber protruding vertically downward at an approximately center thereof and vertically separating the second section into two subsections, and wherein the optical deflector is mounted at a bottom of the chamber of the first section.

57. The optical writing apparatus according to claim 56, wherein the second section and the chamber are insulated from each other with the transparent plates of the separator and wherein the transparent plates are arranged such that a lateral cross-sectional area of the chamber increases with increase in height of the chamber.

58. The optical writing apparatus according to claim 57, further comprising:
a chamber cover configured to cover the chamber from a top side and includes, wherein the chamber cover includes a material having a heat conductance which is higher than a material of the housing.

59. The optical writing apparatus according to claim 56, wherein the separator includes side walls arranged to extend upward from the transparent plates to insulate the first section from a space over the chamber such that a lateral cross-sectional area of the space over the chamber between the side walls increases with increase in height of the space over the chamber.

60. An optical writing apparatus generating a plurality of laser beams according to image data, comprising:
deflecting means for deflecting a first group of the laser beams in a first direction and a second group of laser beams in a second direction symmetrically opposite to the first direction in a same plane;
insulating means for insulating a plurality of lenses from a flow of a heated air produced by the deflecting means; and
correcting means for correcting the first and second groups of laser beams, deflected by the deflecting means, with the plurality of lenses and transmitting the first and second groups of laser beams corrected onto a plurality of photosensitive surfaces disposed outside said optical writing apparatus,
wherein the insulating means includes a separator for separating an inside space of the optical writing apparatus into at least two sections including first and second sections, and the first section includes the deflecting means and the second section includes the correcting means
wherein the optical writing apparatus includes a flat box with the first and second sections at upper and lower sides thereof, respectively, and the first and second sections have a shape in cross-section in which the first section includes a chamber protruding vertically downward at an approximately center thereof and vertically separating the second section into two subsections, and wherein the deflecting means is mounted at a bottom of the chamber of the first section.

61. The optical writing apparatus according to claim 60, wherein the plurality of lenses includes first and second f-theta lenses, each of which are made of a resin material, configured to correct and transmit the first and second groups of laser beams, respectively, which are deflected by the polygon mirror wheel onto the plurality of photosensitive surfaces.

62. An optical writing apparatus generating a plurality of laser beams according to image data, comprising:
deflecting means for deflecting a first group of the laser beams in a first direction and a second group of laser beams in a second direction symmetrically opposite to the first direction in a same plane;
insulating means for insulating a plurality of lenses from a flow of a heated air produced by the deflecting means;
correcting means for correcting the first and second groups of laser beams, deflected by the deflecting means, with the plurality of lenses and transmitting the first and second groups of laser beams corrected onto a plurality of photosensitive surfaces disposed outside said optical writing apparatus; and
an enclosure,
wherein the deflecting means includes a polygon mirror wheel;
wherein the plurality of lenses includes first and second f-theta lenses, each of which are made of a resin material, configured to correct and transmit the first and second groups of laser beams, respectively, which are deflected by the polygon mirror wheel onto the plurality of photosensitive surfaces,
wherein the insulating means includes a separator for separating an inside space of said optical writing apparatus into at least two sections including a first section in which the polygon mirror wheel is mounted and a second section in which the first and second f-theta lenses are mounted,
wherein the separator comprises a transparent plate disposed at each one of positions to cross passages of the first group of laser beams between the polygon mirror wheel and the first f-theta lens and the second group of laser beams between the polygon mirror wheel and the second f-theta lens;
wherein the enclosure is made of a resin material and includes a flat box with the first and second sections at upper and lower sides thereof, respectively, and the first and second sections have a shape in cross-section in which the first section includes a chamber protruding vertically downward at an approximately center thereof and vertically separating the second section into two subsections, and wherein the polygon mirror wheel is mounted at a bottom of the chamber of the first section.

63. The optical writing apparatus according to claim 62, wherein the second section and the chamber are insulated from each other with the transparent plates of the separator, wherein the transparent plates are arranged such that a lateral cross-sectional area of the chamber increases with increase in height of the chamber.

64. The optical writing apparatus according to claim 62, wherein the separator includes side walls arranged to extend upward from the transparent plates to insulate the first section from a space over the chamber such that a lateral cross-sectional area of the space over the chamber between the side walls increases with increase in height of the space over the chamber.

65. The optical writing apparatus according to claim 62, further comprising:
a chamber cover configured to cover the chamber from a top side, wherein the chamber cover includes a material having a heat conductance which is higher than a material of the enclosure.

66. An optical writing apparatus generating a plurality of laser beams according to image data, comprising:
deflecting means for deflecting a first group of the laser beams in a first direction and a second group of laser beams in a second direction symmetrically opposite to the first direction in a same plane;
insulating means for insulating a plurality of lenses from a flow of a heated air produced by the deflecting means;
correcting means for correcting the first and second groups of laser beams, deflected by the deflecting means, with the plurality of lenses and transmitting the first and second groups of laser beams corrected onto a plurality of photosensitive surfaces disposed outside said optical writing apparatus;
an enclosure; and
a top cover configured to seal a first section of the inside space of the enclosure from a top side of the enclosure, wherein the top cover includes a material having a heat conductance which is higher than a material of the enclosure,
wherein the enclosure includes a flat box with the first section and a second section at upper and lower sides thereof, respectively, and the first and second sections have a shape in cross-section in which the first section includes a chamber protruding vertically downward at an approximately center thereof and vertically separating the second section into two subsections, and wherein the deflecting means is mounted at a bottom of the chamber of the first section.

67. An optical writing method, comprising the steps of:
providing an enclosure in which a plurality of laser beams are generated according to image data;
deflecting a first group of the laser beams in a first direction and a second group of laser beams in a second direction symmetrically opposite to the first direction in a same plane with an optical deflector;
insulating a plurality of lenses from a flow of a heated air produced by the deflecting step;
correcting the first and second groups of laser beams, deflected by the deflecting step, with the plurality of lenses; and
transmitting the first and second groups of laser beams corrected onto a plurality of photosensitive surfaces disposed outside the enclosure,
wherein the insulating step is performed with a separator for separating an inside space of the enclosure into at least two sections including first and second sections, and the deflecting step is performed in the first section and the correcting step is performed in the second section,
wherein the enclosure includes a flat box with the first and second sections at upper and lower sides thereof, respectively, and the first and second sections have a shape in cross-section in which the first section includes a chamber protruding vertically downward at an approximately center thereof and vertically separating the second section into two subsections, and
wherein the optical deflector is mounted at a bottom of the chamber of the first section.

68. The optical writing method according to claim 67, wherein the plurality of lenses, each of which are made of a resin material, includes first and second f-theta lenses configured to correct and transmit the first and second groups of laser beams, respectively, which are deflected by the optical deflector onto the plurality of photosensitive surfaces.

69. The optical writing method according to claim 68, wherein the separator comprises a transparent plate disposed at each one of positions to cross passages of the first group of laser beams between the optical deflector and the first f-theta lens and the second group of laser beams between the optical deflector and the second f-theta lens.

70. The optical writing method according to claim 68, wherein the enclosure further includes a top cover configured to seal the first section of the inside space of the housing from a top side of the enclosure, wherein the top cover includes a material having a heat conductance which is higher than a material of the enclosure.

71. An optical writing method, comprising the steps of:
providing an enclosure in which a plurality of laser beams are generated according to image data;
deflecting a first group of the laser beams in a first direction and a second group of laser beams in a second direction symmetrically opposite to the first direction in a same plane;
insulating a plurality of lenses from a flow of a heated air produced by the deflecting step;
correcting the first and second groups of laser beams, deflected by the deflecting step, with the plurality of lenses; and
transmitting the first and second groups of laser beams corrected onto a plurality of photosensitive surfaces disposed outside the enclosure,
wherein the plurality of lenses, each of which are made of a resin material, includes first and second f-theta lenses configured to correct and transmit the first and second groups of laser beams, respectively, which are deflected by a polygon mirror wheel onto the plurality of photosensitive surfaces,
wherein the insulating step uses a separator for separating an inside space of the enclosure into at least two sections including a first section in which the polygon mirror wheel is mounted and a second section in which the first and second f-theta lenses are mounted,
wherein the separator comprises a transparent plate disposed at each one of positions to cross passages of the first group of laser beams between the polygon mirror wheel and the first f-theta lens and the second group of laser beams between the polygon mirror wheel and the second f-theta lens, and
wherein the enclosure is made of a resin material and includes a flat box with the first and second sections at upper and lower sides thereof, respectively, and the first and second sections have a shape in cross-section in which the first section includes a chamber protruding vertically downward at an approximately center thereof and vertically separating the second section into two subsections, and wherein the polygon mirror wheel is mounted at a bottom of the chamber of the first section.

72. The optical writing method according to claim 71, wherein the second section and the chamber are insulated from each other with the transparent plates of the separator, wherein the transparent plates are arranged such that a lateral cross-sectional area of the chamber increases with increase in height of the chamber.

73. The optical writing method according to claim 71, wherein the enclosure further includes a chamber cover configured to cover the chamber from a top side, wherein the chamber cover includes a material having a heat conductance which is higher than a material of the housing.

* * * * *